(12) United States Patent
Chu et al.

(10) Patent No.: US 10,059,858 B2
(45) Date of Patent: Aug. 28, 2018

(54) POLYMER AND DISPERSION LIQUID

(71) Applicant: INDUSTRIAL TECHNOLOGY RESEARCH INSTITUTE, Hsinchu (TW)

(72) Inventors: Yu-Lin Chu, New Taipei (TW); Yu-Min Han, Taichung (TW); Chih-Hsiang Lin, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 121 days.

(21) Appl. No.: 15/392,327

(22) Filed: Dec. 28, 2016

(65) Prior Publication Data

US 2018/0179413 A1 Jun. 28, 2018

(30) Foreign Application Priority Data

Dec. 22, 2016 (TW) .............................. 105142654 A

(51) Int. Cl.
*C09D 153/00* (2006.01)
*C08F 293/00* (2006.01)
(Continued)

(52) U.S. Cl.
CPC ........ *C09D 153/00* (2013.01); *C08F 293/005* (2013.01); *C08K 3/04* (2013.01);
(Continued)

(58) Field of Classification Search
CPC .................................................. C09D 153/00
(Continued)

(56) References Cited

U.S. PATENT DOCUMENTS 3,954,758 A 5/1976 Schuman et al.
4,113,949 A 9/1978 Schuman et al.
(Continued)

FOREIGN PATENT DOCUMENTS

CN 103911024 A 7/2014
JP 5260943 B2 8/2013
(Continued)

OTHER PUBLICATIONS

Taiwanese Notice of Allowance for Appl. No. 105142654 dated May 8, 2017.
(Continued)

*Primary Examiner* — Deve E Valdez
(74) *Attorney, Agent, or Firm* — Birch, Stewart, Kolasch & Birch, LLP

(57) ABSTRACT

A polymer is provided, which has blocks of A-B, wherein the block A has a structure of

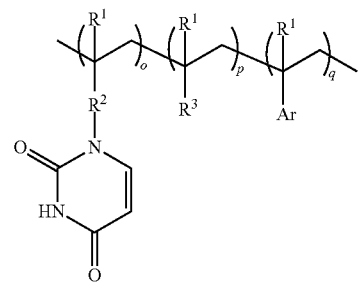

and the block B has a structure of

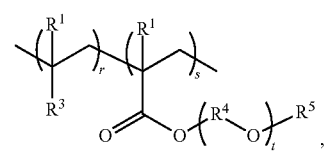

Each of $R^1$ is independently H or methyl group, $R^2$ is

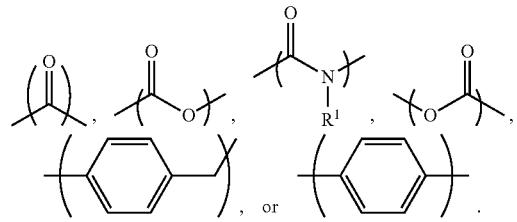

Each of $R^3$ is independently —C(O)OH, —C(O)NHR$^6$NR$^7$R$^8$, —C(O)OR$^6$NR$^7$R$^8$, or —C(O)OR$^9$, wherein $R^6$ is $C_{1-5}$ alkylene group, $R^7$ and $R^8$ are independently H, $C_{1-9}$ alkyl group, $C_{6-9}$ aryl group, or $C_{7-9}$ alkylaryl group. $R^9$ is $C_{1-10}$ alkyl group, $C_{1-20}$ hydroxyalkyl group or alkyl ester group. $R^4$ is $C_{1-12}$ alkylene group, $C_{6-12}$ arylene group, or $C_{7-12}$ alkylarylene group. $R^5$ is H or $C_{1-4}$ alkyl group. Ar is

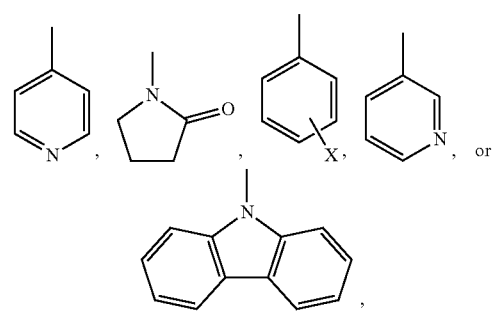

wherein X is H, halogen, alkyl group, or aryl group.

14 Claims, No Drawings

(51) Int. Cl.
    *C09D 11/102*     (2014.01)
    *C09D 11/037*     (2014.01)
    *C08K 3/04*       (2006.01)

(52) U.S. Cl.
    CPC .......... *C09D 11/037* (2013.01); *C09D 11/102* (2013.01); *C08F 2438/03* (2013.01)

(58) Field of Classification Search
    USPC ....................................................... 524/505
    See application file for complete search history.

(56) References Cited

U.S. PATENT DOCUMENTS

| | | |
|---|---|---|
| 5,708,106 A | 1/1998 | Grasshoff et al. |
| 9,045,573 B2 | 6/2015 | Maeta et al. |

FOREIGN PATENT DOCUMENTS

| | | | |
|---|---|---|---|
| TW | 201024329 A1 | | 7/2010 |
| TW | 201525021 A | | 7/2015 |
| TW | I548673 B | | 9/2016 |
| WO | WO 2008/156148 | * | 12/2008 |

OTHER PUBLICATIONS

Cheng et al., "Supramolecular assembly-induced enhanced emission of electrospun nanofibers," Chemical Communications, vol. 51, 2015, pp. 672-675.

Cheng, "Synthesis of 1-(Vinylbenzyl)thymine, A Novel, Versatile Multi-Functional Monomer," Journal of Polymer Science Part A: Polymer Chemistry, vol. 33, 1995, pp. 2515-2519.

Lutz et al., "Preparation by Controlled Radical Polymerization and Self-Assembly via Base-Recognition of Synthetic Polymers Bearing Complementary Nucleobases," Journal of Polymer Science: Part A: Polymer Chemistry, vol. 43, 2005, pp. 4805-4818.

Wang et al., "Bioinspired Photo-Cross-Linked Nanofibers from Uracil-Functionalized Polymers," ACS Macro Letters, vol. 1, 2012 (published Dec. 8, 2011), pp. 159-162.

Wang et al., "Bioinspired supramolecular fibers for mercury ion adsorption," Journal of Materials Chemistry A, vol. 1, 2013, pp. 7745-7750.

York et al., "Advances in the synthesis of amphiphilic block copolymers via RAFT polymerization: Stimuli-responsive drug and gene delivery," Advanced Drug Delivery Reviews, vol. 60, 2008 (Available online Feb. 26, 2008), pp. 1018-1036.

* cited by examiner

POLYMER AND DISPERSION LIQUID

CROSS REFERENCE TO RELATED APPLICATIONS

The present application is based on, and claims priority from, Taiwan Application Serial Number 105142654, filed on Dec. 22, 2016, the disclosure of which is hereby incorporated by reference herein in its entirety.

TECHNICAL FIELD

The technical field relates to a block copolymer.

BACKGROUND

Block copolymers are used widely due to their properties which include having adjustable molecular segment size, molecular weight distribution, chemical composition, structure, and polar/non-polar segments. However, the types of block copolymers that can be used for dispersing pigments are limited, and development of a novel block copolymer for dispersing pigments is still called for.

SUMMARY

One embodiment of the disclosure provides a polymer, which has blocks of A-B, wherein the block A has a structure of

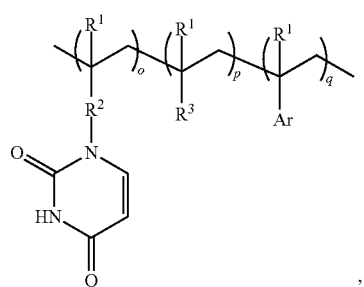

and the block B has a structure of

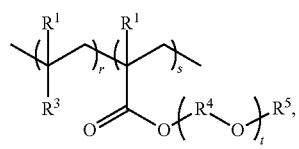

wherein each of $R^1$ is independently H or methyl group, $R^2$ is

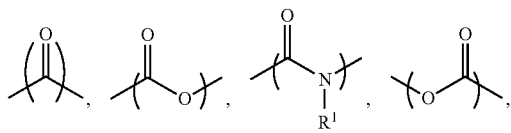

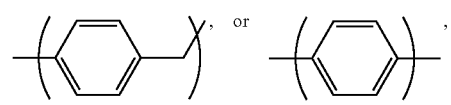

each of $R^3$ is independently —C(O)OH, —C(O)NHR$^6$NR$^7$R$^8$, —C(O)OR$^6$NR$^7$R$^8$, or —C(O)OR$^9$, wherein $R^6$ is $C_{1-5}$ alkylene group, $R^7$ and $R^8$ are independently H, $C_{1-9}$ alkyl group, $C_{6-9}$ aryl group, or $C_{7-9}$ alkylaryl group, and $R^9$ is $C_{1-10}$ alkyl group, $C_{1-20}$ hydroxyalkyl group or alkyl ester group; $R^4$ is $C_{1-12}$ alkylene group, $C_{6-12}$ arylene group, or $C_{7-12}$ alkylarylene group; $R^5$ is H or $C_{1-4}$ alkyl group; Ar is

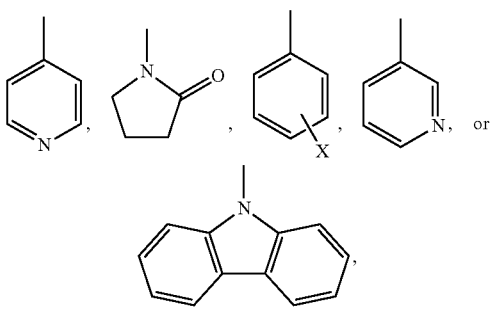

wherein X is H, halogen, alkyl group, or aryl group; o is an integer of 1 to 30, p is an integer of 0 to 50, q is an integer of 0 to 50, r is an integer of 1 to 200, s is an integer of 1 to 200, and t is an integer of 1 to 50.

One embodiment of the disclosure provides a dispersion liquid, comprising: 100 parts by weight of solvent; 0.01 to 400 parts by weight of dispersing agent; and 1 to 200 parts by weight of powder, wherein the dispersing agent is a polymer having blocks A-B, wherein the block A has a structure of

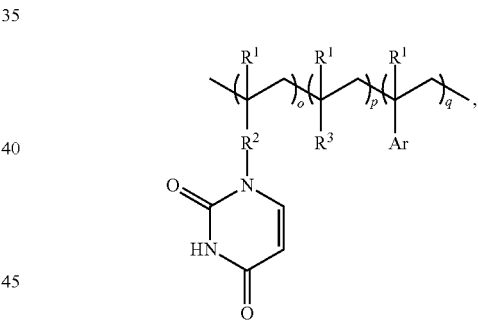

and the block B has a structure of

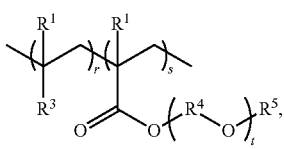

wherein each of $R^1$ is independently H or methyl group, $R^2$ is

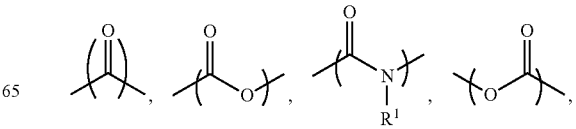

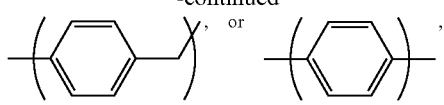

each of $R^3$ is independently —C(O)OH, —C(O)NHR$^6$NR$^7$R$^8$, —C(O)OR$^6$NR$^7$R$^8$, or —C(O)OR$^9$, wherein $R^6$ is $C_{1-5}$ alkylene group, $R^7$ and $R^8$ are independently H, $C_{1-9}$ alkyl group, $C_{6-9}$ aryl group, or $C_{7-9}$ alkylaryl group, and $R^9$ is $C_{1-10}$ alkyl group, $C_{1-20}$ hydroxyalkyl group or alkyl ester group; $R^4$ is $C_{1-12}$ alkylene group, $C_{6-12}$ arylene group, or $C_{7-12}$ alkylarylene group; $R^5$ is H or $C_{1-4}$ alkyl group; Ar is

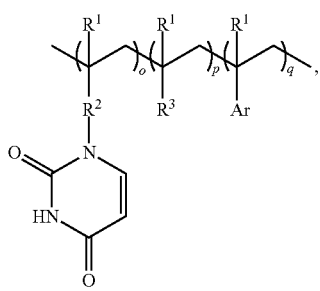

wherein X is H, halogen, alkyl group, or aryl group; o is an integer of 1 to 30, p is an integer of 0 to 50, q is an integer of 0 to 50, r is an integer of 1 to 200, s is an integer of 1 to 200, and t is an integer of 1 to 50.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

A polymer is provided, which has blocks of A-B, wherein the block A has a structure of

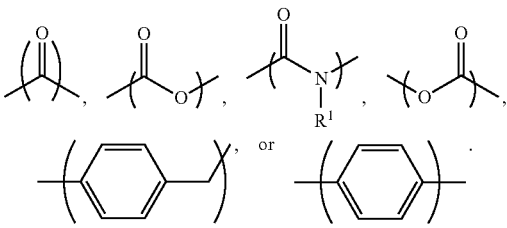

and the block B has a structure of

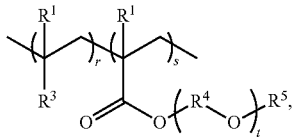

Each of $R^1$ is independently H or methyl group. $R^2$ is

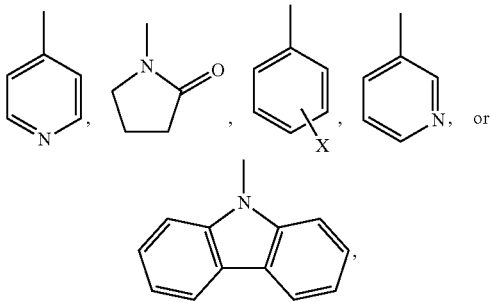

Each of $R^3$ is independently —C(O)OH, —C(O)NHR$^6$NR$^7$R$^8$, —C(O)OR$^6$NR$^7$R$^8$, or —C(O)OR$^9$, wherein $R^6$ is $C_{1-5}$ alkylene group. $R^7$ and $R^8$ are independently H, $C_{1-9}$ alkyl group, $C_{6-9}$ aryl group, or $C_{7-9}$ alkylaryl group. $R^9$ is $C_{1-10}$ alkyl group, $C_{1-20}$ hydroxyalkyl group or alkyl ester group. $R^4$ is $C_{1-12}$ alkylene group, $C_{6-12}$ arylene group, or $C_{7-12}$ alkylarylene group. $R^5$ is H or $C_{1-4}$ alkyl group. Ar is wherein X is H, halogen, alkyl group, or aryl group. o is an integer of 1 to 30, p is an integer of 0 to 50, q is an integer of 0 to 50, r is an integer of 1 to 200, s is an integer of 1 to 200, and t is an integer of 1 to 50. As described above, the block A and the block B are the necessary blocks of the polymer. If a polymer only includes the block A without the block B, the powder dispersed by the polymer easily re-aggregates. If a polymer only includes the block B without the block A, the powder will not be easily dispersed by the polymer.

In one embodiment, the block A is composed of only the repeating unit with the repeating number of o (e.g. p and q are 0). In one embodiment, the block A is composed of not only the repeating unit with the repeating number o, but also the repeating unit with the repeating number p, the repeating unit with the repeating number q, or a combination thereof. In addition, the arrangements of the repeating units can be random or block. Accordingly, the repeating unit with the repeating number o (having the uracil group) is the necessary repeating unit of the block A. When the polymer is used to disperse powder such as carbon black, the uracil group has a higher dispersive ability due to it may anchor to several points of the powder surface. The repeating units with the repeating number p and q may provide additional adsorption interaction with the powder. Too much the repeating unit with the repeating numbers p and q may lower the solubility of the polymer in a solvent. In one embodiment, the arrangement of the repeating units with the repeating numbers r and s in the block B can be random or block. If the block B only includes the repeating unit with the repeating number r without the repeating unit with the repeating number s, the polymer will be overly lipophilic. If the block B only includes the repeating unit with the repeating number s without the repeating unit with the repeating number r, the polymer will be overly hydrophilic.

In one embodiment, the polymer has a weight average molecular weight of 1000 to 100000, or 5000 to 30000. The block A has a weight average molecular weight of 300 to 5000, or 200 to 3000. The block B has a weight average molecular weight of 700 to 95000, or 1000 to 30000. A polymer with too low a weight average molecular weight cannot prevent the powder from being aggregated. A polymer with too high a weight average molecular weight is easily tangled, thereby resulting in a larger aggregation of the powder. A polymer including a block A with an overly low weight average molecular weight (or a block B with an overly high weight average molecular weight) cannot stably adsorb on the powder. A polymer including a block A with an overly high weight average molecular weight (or a block with an overly low weight average molecular weight) cannot form a polymer film with a sufficient thickness on the powder, and the powder therefore aggregates.

In one embodiment, the block A is polymerized by the reversible addition-fragmentation chain transfer (RAFT) polymerization, and the monomers corresponding to the block B is then added to be polymerized by the RAFT polymerization to form the block copolymer containing the blocks of A-B. Alternatively, the block copolymer containing the blocks A-B can be polymerized by other method, such as atom-transfer radical-polymerization (ATRP), nitroxide mediated polymerization (NMP), group transfer polymerization (GTP), living anionic polymerization, or living cationic polymerization, which is not limited to the RAFT polymerization. For example, the polymer can be polymerized by the following steps. Note that the method below is used to illustrate rather than limit the disclosure. One skilled in the art may synthesize the polymer using any suitable method, which is not limited by the following synthesis strategy.

First, a monomer with ethylene group is reacted with a uracil salt, as shown in Formula 1.

(Formula 1)

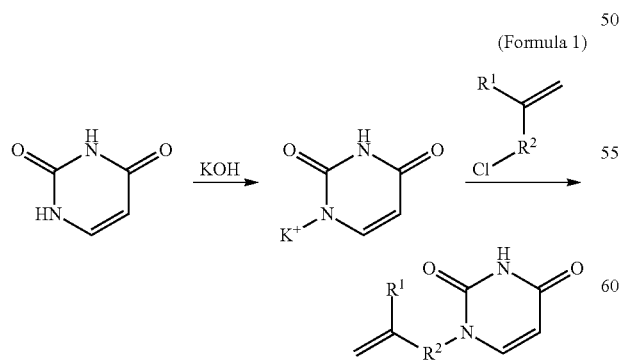

Subsequently, the product in Formula 1 is polymerized with other monomers to form the block A, as shown in Formula 2. In Formula 1, the RAFT agent is 2-(dodecyltri- thiocarbonate-yl) propionic acid. However, another RAFT agent can be used for the polymerization. It should be understood that the arrangement of the repeating units in the block A will be random if the monomers are simultaneously reacted. The arrangement of the repeating units in the block A will be block if the monomers are sequentially reacted.

(Formula 2)

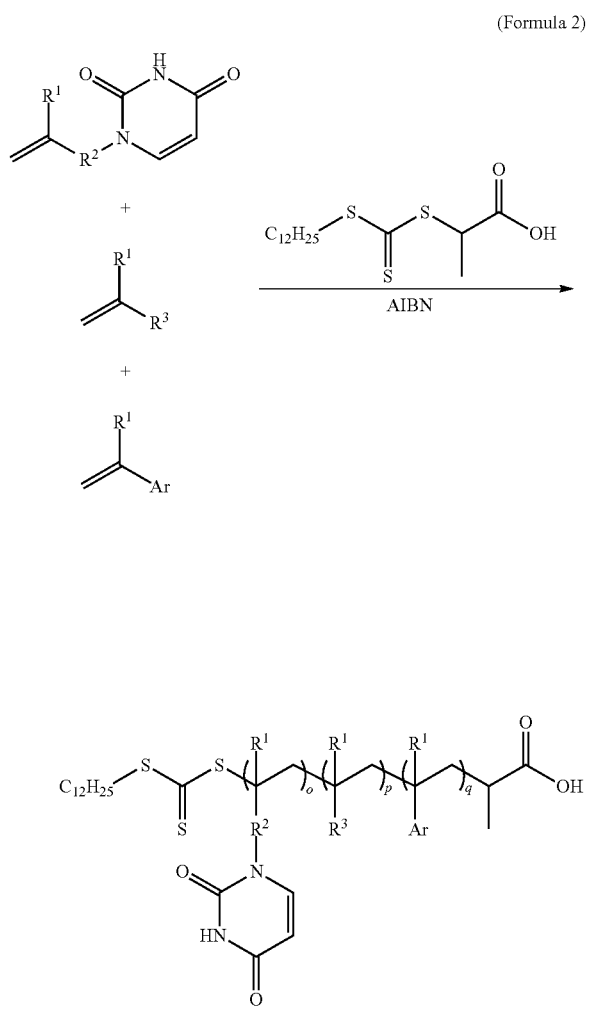

Subsequently, the product in Formula 2 (e.g. the block A) is polymerized with other monomers to form the block B, thereby obtaining the block copolymer containing the blocks A-B. It should be understood that the arrangement of the repeating units in the block B will be random if the monomers are simultaneously reacted. The arrangement of the repeating units in the block B will be block if the monomers are sequentially reacted.

(Formula 3)

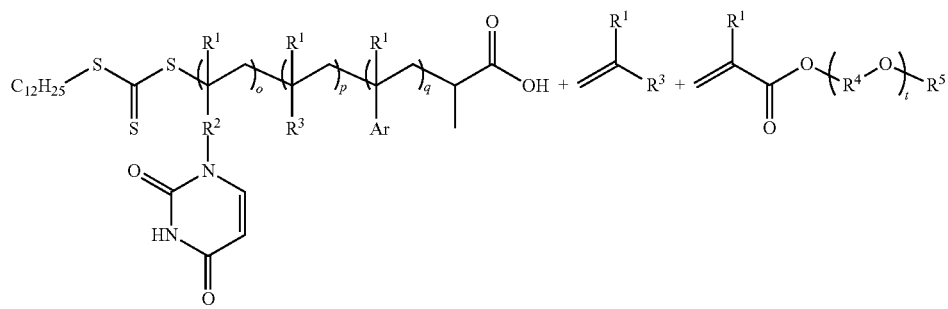

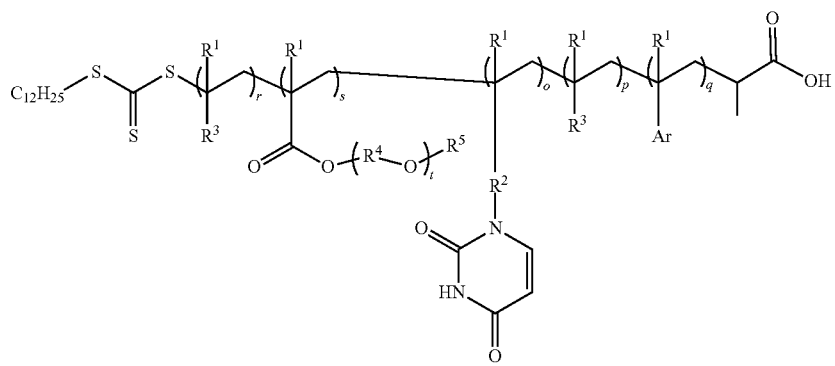

In the above embodiment, the formation of the block A is before the formation of the block B. It should be understood that the formation of the block B can be before the formation of the block A, too. In one embodiment, the block A is

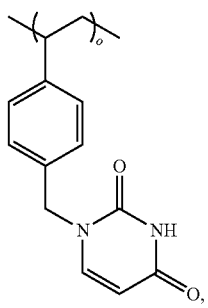

and the block B is

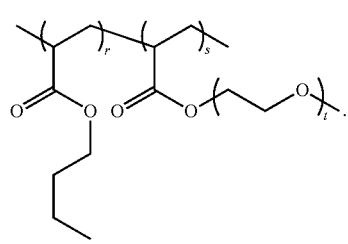

Alternatively, the block A is

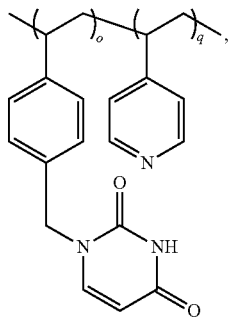

and the block B is

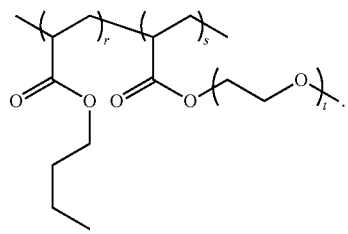

The polymer may serve as a dispersing agent in dispersion liquid. For example, 100 parts by weight of solvent, 0.01 to 400 parts by weight of the dispersing agent (e.g. the aforementioned polymer), and 1 to 200 parts by weight of powder can be mixed to form the dispersion liquid. In one embodiment, the solvent can be aliphatic alkane, alkene, alcohol, aldehyde, amine, ester, ether, ketone, aromatic hydrocarbon, hydrogenated hydrocarbon, terpene hydrocarbon, halogenated hydrocarbon, heterocyclic compound, nitrogen-containing compound, sulfur-containing compound, or a combination thereof. An overly low ratio of the polymer (dispersing agent) cannot easily rinse and disperse the powder. An overly high ratio of the polymer (dispersing agent) may tangle, increasing the viscosity of the dispersion liquid. In one embodiment, the powder can be organic or inorganic pigment, such as 1-amino anthraquinone, anthanthrone, anthrapyrimidine, azo, azomethine, quinacridone, quinacridonequinone, quinophthalone, dioxazine, diketopyrrolopyrrole, flavanthrone, indanthrone, isoindoline, isoindolinone, isoviolanthrone, perinone, perylene, phthalocyanine, pyranthrone or thioindigo series, including those, where applicable, in the form of metal complexes or the like. Azos may be, for example, mono- or dis-azo pigments from any known sub-class, obtainable, for example, by coupling, condensation or like formation. Examples of organic pigments include Color Index Pigment Yellow 3, 12, 13, 14, 17, 24, 34, 42, 53, 62, 74, 83, 93, 95, 108, 109, 110, 111, 119, 123, 128, 129, 139, 147, 150, 164, 168, 173, 174, 184, 188, 191, 191:1, 193, 199, Pigment Orange 5, 13, 16, 34, 40, 43, 48, 49, 51, 61, 64, 71, 73, Pigment Red 2, 4, 5, 23, 48:1, 48:2, 48:3, 48:4, 52:2, 53:1, 57, 57:1, 88, 89, 101, 104, 112, 122, 144, 146, 149, 166, 168, 177, 178, 179, 181, 184, 190, 192, 194, 202, 204, 206, 207, 209, 214, 216, 220, 221, 222, 224, 226, 254, 255, 262, 264, 270, 272, Pigment Brown 23, 24, 33, 42, 43, 44, Pigment Violet 19, 23, 29, 31, 37, 42, Pigment Blue 15, 15:1, 15:2, 15:3, 15:4, 15:6, 16, 28, 29, 60, 64, 66, Pigment Green 7, 17, 36, 37, 50, Pigment White 6, Pigment Black 7, 12, 27, 30, 31, 32. Preference is given to phthalocyanine pigments, azobenzimidazolone, disazo and polycyclic pigments and also to isoindolinones, perylenes, carbon black, or a combination thereof. An overly low ratio of the powder results in a low shielding ability. An overly high ratio of the powder can easily be precipitated from the dispersion liquid. The powder (e.g. carbon black) has a diameter of 8 nm to 500 nm. Too small a powder cannot be easily dispersed due to its overly large specific surface area. The ink (e.g. dispersion liquid) including too big a powder may have a poor brightness.

In one embodiment, the dispersion liquid may further include 1 to 1000 parts by weight of resin serving as a film forming binder resin, which can be thermoplastic, chemically crosslinked or structurally crosslinked polymer. The resin can be film forming physically drying binder resin, thermal crosslinkable film forming binder resin, or a combination thereof. The film forming physically drying binder resin is typically derived from α,β-unsaturated acid or a derivative thereof (e.g. polyacrylate, polymethacrylate, polymethyl methacrylate, polyacrylamide, or polyacrylonitrile) or a natural polymer (e.g. cellulose acetate or cellulose butyrate). The physically drying alkyd resin or nitro cellulose lacquer can be used too.

The thermally crosslinkable film forming binder resin can be: 1. A crosslinked polymer from aldehyde and phenol, urea, or melamine, such as phenol/formaldehyde resin, urea/formaldehyde resin, or melamine/formaldehyde resin. 2. A drying or non-drying alkyd resin. 3. Unsaturated polyester resins derived from saturated and unsaturated dicarboxylic acids with polyhydric alcohols and vinyl compounds as copolyester crosslinking agents, and a halogen-containing low-flammability modification thereof 4. Crosslinkable acrylic resin, derived from substituted acrylates, for example its own epoxy acrylates, urethane acrylates or polyester acrylates. These resins are typically crosslinked by melamine resin or multi-isocyanate resin, and which are known as thermosetting acrylic acid resin. 5. Alkyd resin, polyester resin, or acrylate resin crosslinked by melamine resin, urea resin, isocyanate, isocyanurate, polyisocyanate, or epoxy resin. 6. The crosslinked epoxy resins derived from aliphatic, cycloaliphatic, heterocyclic or aromatic glycidyl compounds, e.g., by general hardeners such as anhydrides or amines with or without accelerators and crosslinking, the bisphenol A and bisphenol F diglycidyl ether diglycidyl product. An overly low amount of the resin cannot provide excellent film formability. An overly high amount of the resin may lower the shielding ability of the ink (dispersion liquid). For example, the polymer may serve as a dispersing agent of a black ink to efficiently disperse the carbon black thereof.

Below, exemplary embodiments will be described in detail so as to be easily realized by a person having ordinary knowledge in the art. The inventive concept may be embodied in various forms without being limited to the exemplary embodiments set forth herein.

EXAMPLES

Example 1

222 mmole of KOH was added into 220 mL of water and 220 mmole uracil. The mixture was reacted and dehydrated to precipitate an ionic product on reactor wall. 220 mmole of the ionic product, 264 mmole of vinyl benzyl chloride (VBC), and 0.3 mmole of inhibitor benzothiadiazole (BTH) were added into 550 g of dimethylacetamide (DMAc), and then heated to 70° C. to react for 24 hours. The DMAc was then removed to obtain a solid, and 361 mL of toluene was then added and boiled for dissolving the solid. The hot toluene solution was filtered to collect the filtrate, and the filtrate was cooled to precipitate solid. The cooled filtrate was filtered to collect the filtered cake as the product. The reaction is shown in Formula 4. The spectra of the product is shown below: $^1$H NMR (500 MHz, d$_6$-DMSO, 25° C., TMS): δ=11.32 (br, 1H; NH), 7.74 (d, J=7.8 Hz, 1H; CH), 7.45 (d, J=7.8 Hz, 1H; ArCH), 7.25 (d, J=7.3 Hz, 1H; ArCH), 6.7 (dd, J1=11 Hz, J2=10.8 Hz, 1H; CH), 5.81 (d, J=17.6 Hz, 1H; CH), 5.58 (d, J=7.7 Hz, 1H; CH), 5.25 (d, J=11 Hz, 1H; CH), 4.84 (s, 2H; CH2) ppm.

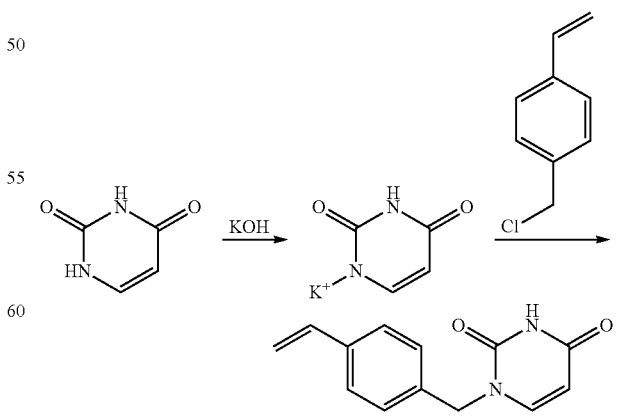

(Formula 4)

Subsequently, 2.8 mmole of RAFT agent (2-(dodecyltrithiocarbonate-yl) propionic acid), 42.7 mmole of the product in Formula 4, and 0.85 mmole of thermal initiator azobisisobutyronitrile (AIBN) were added into 43.6 g of DMAc, and then heated to 75° C. to react for 24 hours. The reaction was then cooled, and acetone was poured into the mixture of the reaction result to re-precipitate a solid. The solid was collected as product. The solid was measured by gel permeation chromatography (GPC) to analyze its weight average molecular weight (Mw, 1589), number average molecular weight (Mn, 1407), and polymer dispersity index (PDI, 1.13). The reaction is shown in Formula 5. In Formula 5,

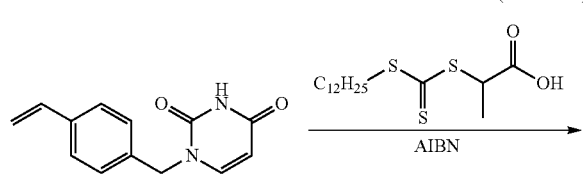

(Formula 5)

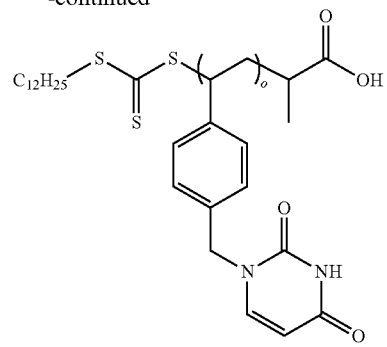

Subsequently, 2.8 mmole of the product in Formula 5, 114.09 mmole of the butyl acrylate, 59.9 mmole of poly(ethylene glycol) methyl ether acrylate (PEGMEA, #454990 from Aldrich), and 0.71 mmole of AIBN were added into 54.2 g of DMAc, and then heated to 75° C. to react for 24 hours. The reaction was then cooled, and ethyl ether was poured into the mixture of the reaction result to re-precipitate a solid. The solid was collected as product. The solid was measured by GPC to analyze its Mw (19950), Mn (14353), and PDI (1.39). The reaction is shown in Formula 6. In Formula 6, o=5, r=40, s=21, and t=9.

(Formula 6)

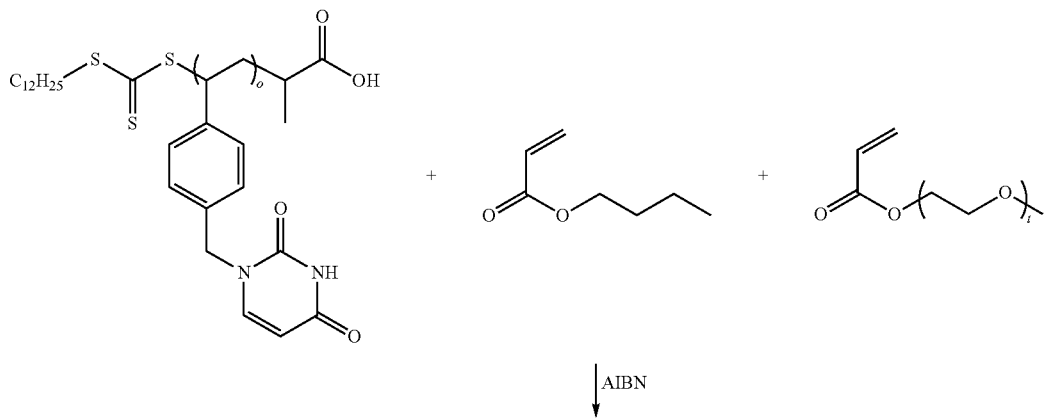

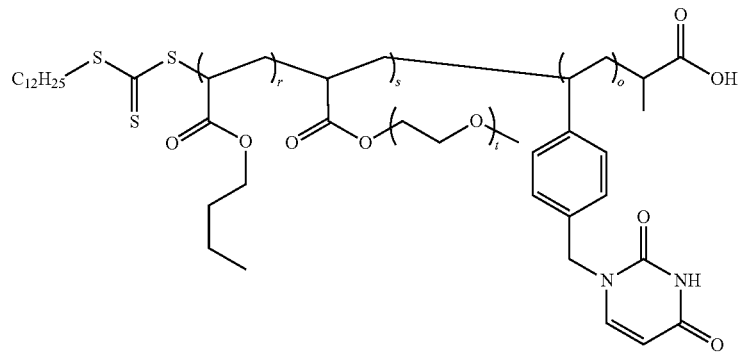

Example 2

2.8 mmole of the RAFT agent, 14.2 mmole of the product in Formula 4, 14.2 mmole of 4-vinyl pyridine, and 0.285 mmole of AIBN were added into 23.2 g of DMAc, and then heated to 75° C. to react for 24 hours. The reaction was then cooled, and acetone was poured into the mixture of the reaction result to re-precipitate a solid. The solid was collected as product. The solid was measured by GPC to analyze its Mw (1540), Mn (1351), and PDI (1.14). The reaction is shown in Formula 7. In Formula 7, o=4 and q=4.

(Formula 7)

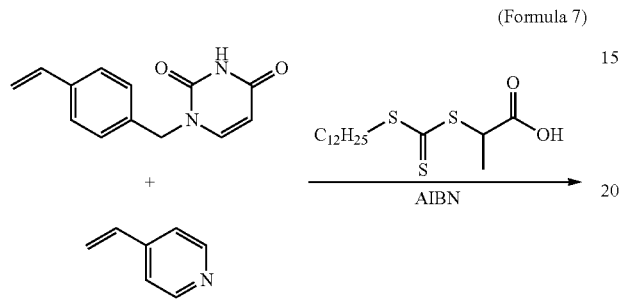

Subsequently, 2.8 mmole of the product in Formula 7, 114 mmole of the butyl acrylate, 59.9 mmole of PEGMEA, and 0.14 mmole of AIBN were added into 49.12 g of DMAc, and then heated to 75° C. to react for 24 hours. The reaction was then cooled, and ethyl ether was poured into the mixture of the reaction result to re-precipitate a solid. The solid was collected as product. The solid was measured by GPC to analyze its Mw (17868), Mn (13455), and PDI (1.33). The reaction is shown in Formula 8. In Formula 8, o=4, q=4, r=40, s=21, and t=9.

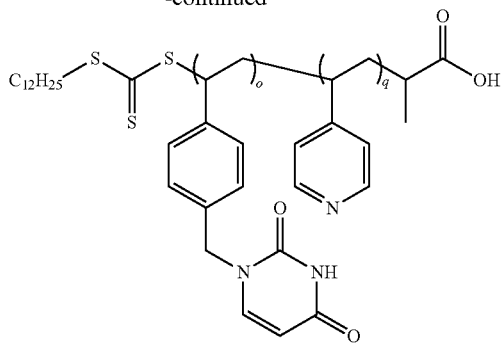

(Formula 8)

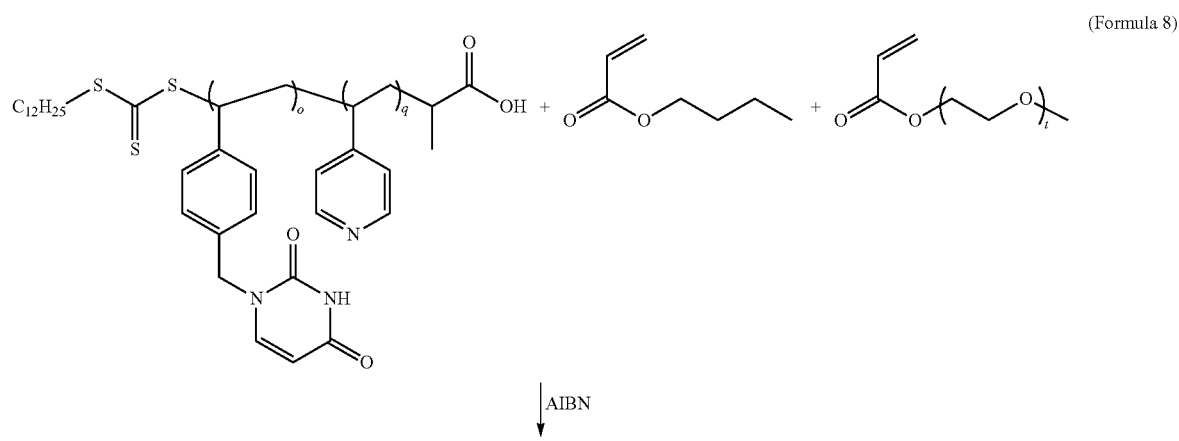

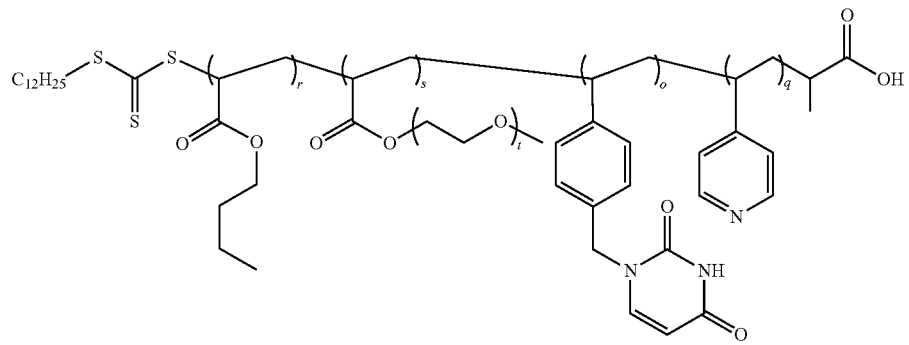

Comparative Example 1

17.1 mmole of the RAFT agent, 171 mmole of 4-vinyl pyridine, and 5.99 mmole of AIBN were added into 49.9 g of solvent PEMEA/propylene glycol monomethyl ether (PGME) (w/w=1/1), and then heated to 75° C. to react for 6 hours. The reaction was then cooled, and ethyl ether was poured into the mixture of the reaction result to re-precipitate a solid. The solid was collected as product. The solid was measured by GPC to analyze its Mw (1556), Mn (1415), and PDI (1.10). The reaction is shown in Formula 9. In Formula 9, q=10.

(Formula 9)

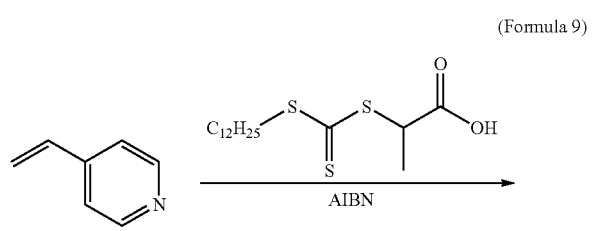

Subsequently, 17.1 mmole of the product in Formula 9, 684.5 mmole of the butyl acrylate, 359.3 mmole of PEG-MEA, and 1.71 mmole of AIBN were added into 171.2 g of PEMEA/PGME (w/w=1/1), and then heated to 75° C. to react for 6 hours. The reaction was then cooled, and ethyl ether was poured into the mixture of the reaction result to re-precipitate a solid. The solid was collected as product. The solid was measured by GPC to analyze its Mw (15399), Mn (12520), and PDI (1.23). The reaction is shown in Formula 10. In Formula 10, q=10, r=40, s=21, and t=9.

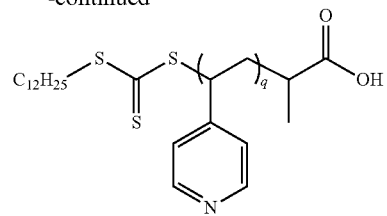

(Formula 10)

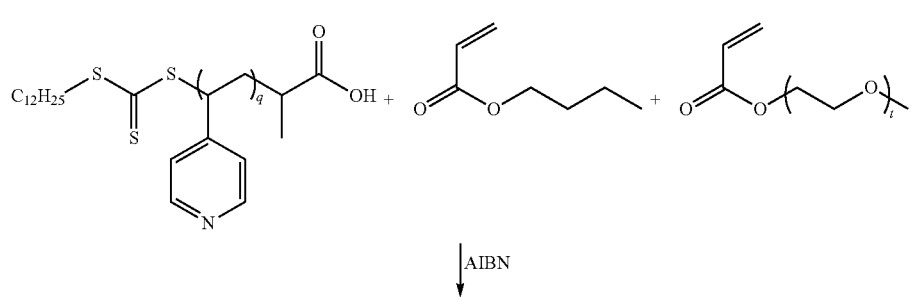

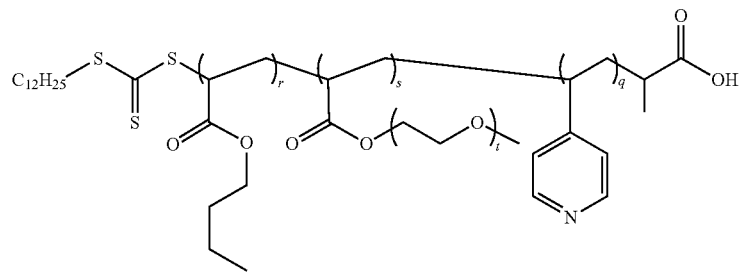

Comparative Example 2

2.85 mmole of the RAFT agent, 28.25 mmole of the produce of Formula 4, and 0.428 mmole of AIBN were added into 30.2 g of DMAc, and then heated to 75° C. to react for 24 hours. The reaction was then cooled, and acetone was poured into the mixture of the reaction result to re-precipitate a solid. The solid was collected as product. The solid was measured by GPC to analyze its Mw (1667), Mn (1489), and PDI (1.12). The reaction is shown in Formula 11. In Formula 11, $o=5$.

mmole of PEGMEA, and 0.42 mmole of AIBN were added into 23.51 g of DMAc, and then heated to 75° C. to react for 24 hours. The reaction was then cooled, and acetone was poured into the mixture of the reaction result to re-precipitate a solid. The solid was collected as product. The solid was measured by GPC to analyze its Mw (16005), Mn (12218), and PDI (1.31). The reaction is shown in Formula 12. In Formula 12, $o=5$, $r=40$, $s=21$, and $t=9$. Obviously, the product in Comparative Example 3 is a random copolymer rather than a block copolymer.

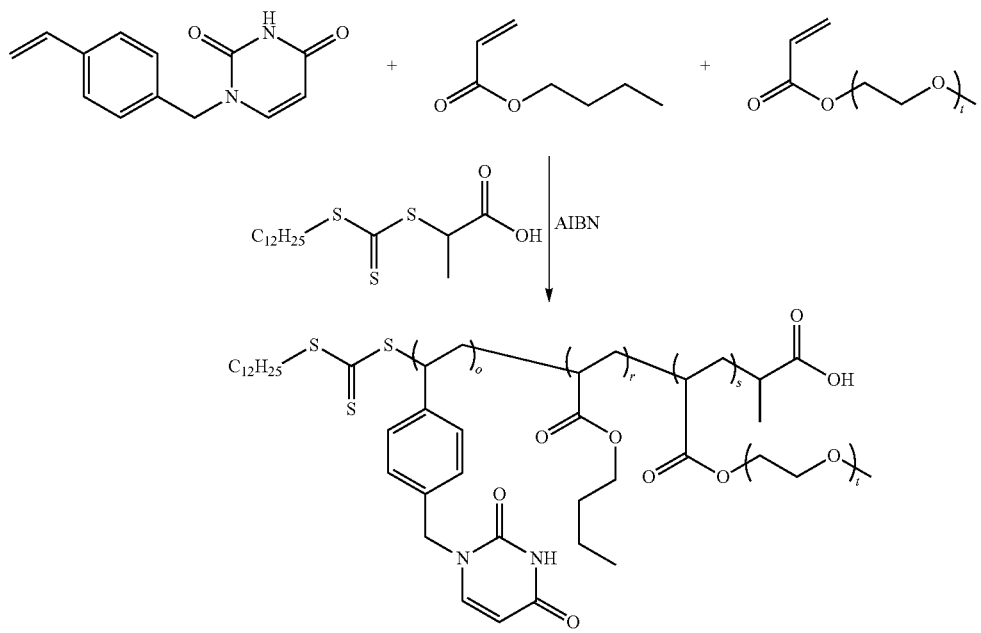

(Formula 12)

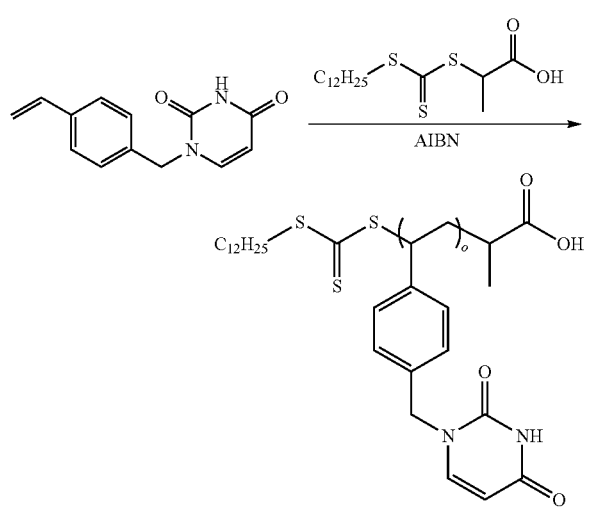

(Formula 11)

Comparative Example 3

1.42 mmole of the RAFT agent, 14.2 mmole of the produce of Formula 4, 57.05 mmole of butyl acrylate, 29.95

Example 3-1

10 parts by weight of carbon black (Mogul L, commercially available from CABOT), 1.5 parts by weight of the dispersing agent (the product of Formula 6 in Example 1), 27 parts by weight of solvent (isophorone/PEMEA, w/w=2/1), 60 parts by weight of resin (varnish PET-9100, commercially available from Jujo Chemical Co., Ltd. Japan), and 1.5 parts by weight of other additive (3M-4430 and Dow Corning-57) were mixed and milled to be dispersed for forming a black ink. The black ink had a viscosity of 6260 cps at 25° C., which was measured by Brookfield DV-III. 10 g of sample and a #7 rotator were put into a test tube, and the sample was rotated from a low rpm to a high rpm to measure its viscosity. The black ink had an optical density of 4.5 and a light transmittance of 0.0031%, which were measured by LS117 commercially available from Shenzhen Linshang Technology Co., Ltd. The black ink was coated on a substrate, and the substrate was horizontally put between a light source (380 nm to 760 nm, full wavelength) and a detector of the optical density analyzer. The light source, the sample (substrate with the black ink coated thereon), and the detector were attached, and the measurement signals (the optical density and the light transmittance) were obtained after 3 to 5 seconds. The black ink had a dispersed particle diameter of 140 nm, which was measured by Malvern Zetasizer Nano ZS. The black ink was diluted to a concentration of 100 ppm, and 1 mL of the diluted sample was put into a color comparison tube to measure its particle diameter distribution.

Example 3-2

Example 3-2 was similar to Example 3-1, with the difference being that the dispersing agent was replaced with the product of Formula 8 in Example 2 to prepare the black ink. The ratios of the other components and method for measuring the properties of the black ink were similar to those in Example 3-1. The black ink had a viscosity of 9076 cps at 25° C., an optical density of 4.7, a light transmittance of 0.0019%, and a dispersed particle diameter of 126 nm.

Example 3-3

Example 3-3 was similar to Example 3-1, with the difference being that the dispersing agent was replaced with the product of Formula 10 in Comparative Example 1 to prepare the black ink. The ratios of the other components and method for measuring the properties of the black ink were similar to those in Example 3-1. The black ink had a viscosity of 6302 cps at 25° C., an optical density of 4.2, a light transmittance of 0.0063%, and a dispersed particle diameter of 312 nm. Obviously, the copolymer in Comparative Example 1 lacked of the repeating unit containing the uracil, which could not efficiently disperse the carbon black. As such, the carbon black in the black ink had a larger diameter, and the black ink had a higher light transmittance.

Example 3-4

Example 3-4 was similar to Example 3-1, with the difference being that the dispersing agent was replaced with the product of Formula 11 in Comparative Example 2 to prepare the black ink. The ratios of the other components and method for measuring the properties of the black ink were similar to those in Example 3-1. The black ink had a viscosity of 3810 cps at 25° C., an optical density of 2.89, a light transmittance of 0.128%, and a dispersed particle diameter of 1307 nm. Obviously, the homopolymer of only the repeating unit containing the uracil group could not efficiently disperse the carbon black. As such, the carbon black in the black ink had a larger diameter, and the black ink had a higher light transmittance.

Example 3-5

Example 3-5 was similar to Example 3-1, with the difference being that the dispersing agent was replaced with the product of Formula 12 in Comparative Example 3 to prepare a mixture. The ratios of the other components and method for measuring the properties of the mixture were similar to those in Example 3-1. The mixture had a lower dynamic viscosity but a higher static viscosity at 25° C. (similar to a rheological agent), and could not be coated on a substrate surface to measure its optical density and light transmittance. In short, the mixture could not serve as a black ink. The mixture had a dispersed particle diameter of 108 nm. Although the repeating units in Comparative Example 3 were similar to those in Example 1, but the random copolymer was improper to be a dispersing agent for a black ink.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A polymer, comprising blocks of A-B, wherein the block A has a structure of

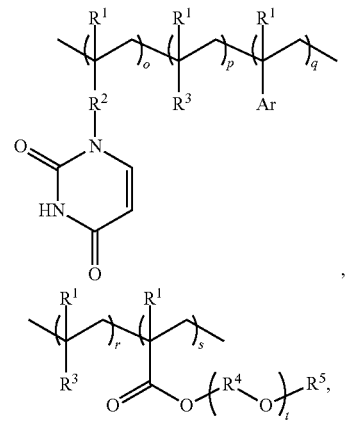

and the block B has a structure of
wherein each of $R^1$ is independently H or methyl group, $R^2$ is

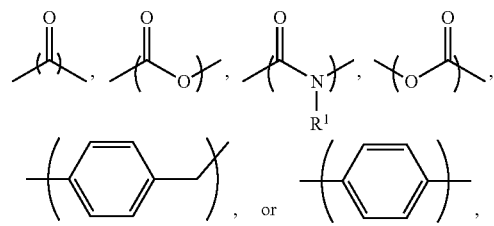

each of $R^3$ is independently —C(O)OH, —C(O)NHR$^6$NR$^7$R$^8$, —C(O)OR$^6$NR$^7$R$^8$, or —C(O)OR$^9$, wherein $R^6$ is $C_{1-5}$ alkylene group, $R^7$ and $R^8$ are independently H, $C_{1-9}$ alkyl group, $C_{6-9}$ aryl group, or $C_{7-9}$ alkylaryl group, and $R^9$ is $C_{1-10}$ alkyl group, $C_{1-20}$ hydroxyalkyl group or alkyl ester group;

$R^4$ is $C_{1-12}$ alkylene group, $C_{6-12}$ arylene group, or $C_{7-12}$ alkylarylene group;

$R^5$ is H or $C_{1-4}$ alkyl group;

Ar is

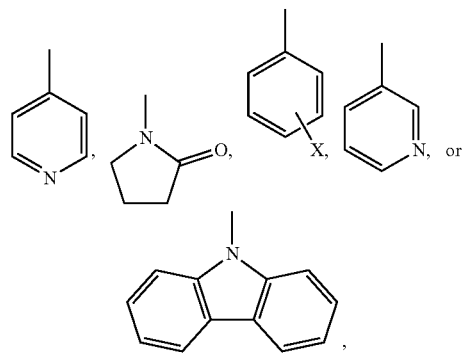

wherein X is H, halogen, alkyl group, or aryl group;
o is an integer of 1 to 30, p is an integer of 0 to 50, q is an integer of 0 to 50, r is an integer of 1 to 200, s is an integer of 1 to 200, and t is an integer of 1 to 50.

2. The polymer as claimed in claim 1, wherein an arrangement of the repeating units of different repeating numbers in the block A is random or block.

3. The polymer as claimed in claim 1, wherein an arrangement of the repeating units of different numbers in the block B is random or block.

4. The polymer as claimed in claim 1, wherein the block A is

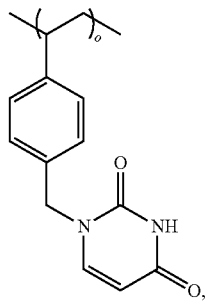

and the block B is

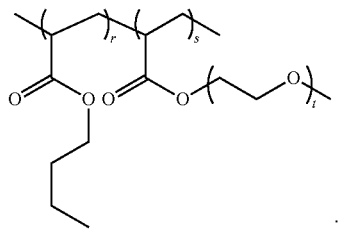

5. The polymer as claimed in claim 1, wherein the block A is

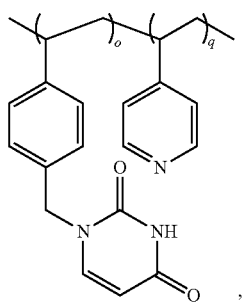

and the block B is

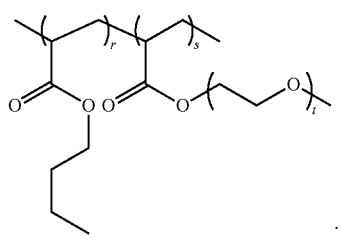

6. The polymer as claimed in claim 1, having a weight average molecular weight of 1000 to 100000.

7. A dispersion liquid, comprising:
100 parts by weight of solvent;
0.01 to 400 parts by weight of dispersing agent; and
1 to 200 parts by weight of powder,
wherein the dispersing agent is a polymer having blocks A-B,
the block A has a structure of

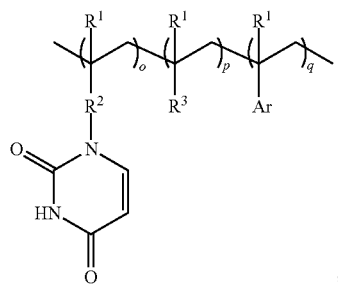

and the block B has a structure of

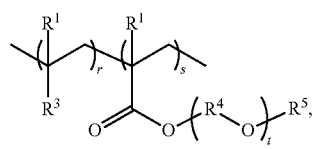

wherein each of $R^1$ is independently H or methyl group, $R^2$ is

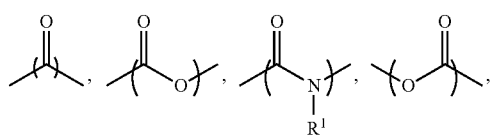

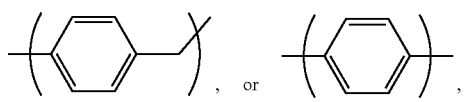

each of $R^3$ is independently —C(O)OH, —C(O)NHR$^6$NR$^7$R$^8$, —C(O)OR$^6$NR$^7$R$^8$, or —C(O)OR$^9$, wherein $R^6$ is $C_{1-5}$ alkylene group, $R^7$ and $R^8$ are independently H, $C_{1-9}$ alkyl group, $C_{6-9}$ aryl group, or $C_{7-9}$ alkylaryl group, and $R^9$ is $C_{1-10}$ alkyl group, $C_{1-20}$ hydroxyalkyl group or alkyl ester group;

$R^4$ is $C_{1-12}$ alkylene group, $C_{6-12}$ arylene group, or $C_{7-12}$ alkylarylene group;

$R^5$ is H or $C_{1-4}$ alkyl group;

Ar is

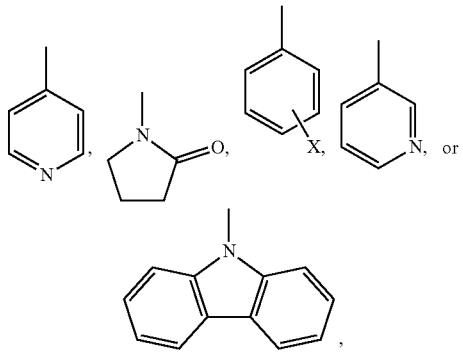

wherein X is H, halogen, alkyl group, or aryl group;
o is an integer of 1 to 30, p is an integer of 0 to 50, q is an integer of 0 to 50, r is an integer of 1 to 200, s is an integer of 1 to 200, and t is an integer of 1 to 50.

8. The dispersion liquid as claimed in claim 7, wherein the powder has a diameter of 8 nm to 500 nm.

9. The dispersion liquid as claimed in claim 7, further comprising 1 to 1000 parts by weight of resin, and the resin includes film forming physically drying binder resin, thermal crosslinkable film forming binder resin, or a combination thereof.

10. The dispersion liquid as claimed in claim 7, wherein an arrangement of the repeating units of different repeating numbers in the block A is random or block.

11. The dispersion liquid as claimed in claim 7, wherein an arrangement of the repeating units of different numbers in the block B is random or block.

12. The dispersion liquid as claimed in claim 7, wherein the block A is

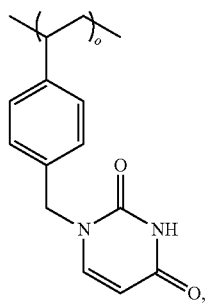

and the block B is

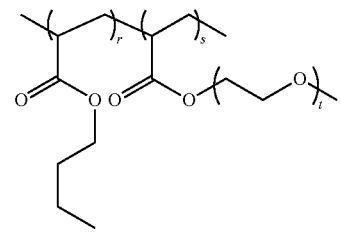

13. The dispersion liquid as claimed in claim 7, wherein the block A is

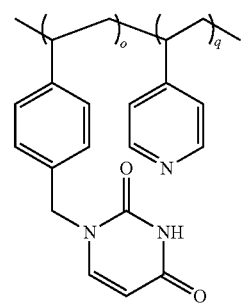

and the block B is

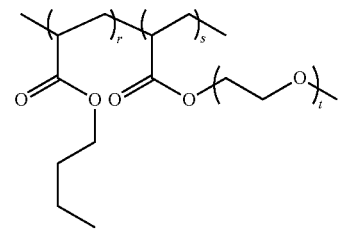

14. The dispersion liquid as claimed in claim 7, wherein the polymer has a weight average molecular weight of 1000 to 100000.

* * * * *